United States Patent
Daniel (10) Patent No.: US 9,760,877 B1
(45) Date of Patent: Sep. 12, 2017

(54) SYSTEM AND METHOD FOR SECURE PAYMENT PROCESSING USING SUBSCRIBER IDENTITY MODULE CARDS

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 60 days.

(21) Appl. No.: 14/719,191

(22) Filed: May 21, 2015

Related U.S. Application Data (60) Provisional application No. 62/001,507, filed on May 21, 2014.

(51) Int. Cl.
*G06Q 20/16* (2012.01)
*H04W 4/24* (2009.01)
*G06Q 20/06* (2012.01)
*H04M 15/00* (2006.01)

(52) U.S. Cl.
CPC ............. *G06Q 20/16* (2013.01); *G06Q 20/06* (2013.01); *H04M 15/7556* (2013.01); *H04W 4/24* (2013.01)

(58) Field of Classification Search
CPC ... H04M 2215/32; H04M 15/28; H04W 4/24; G06Q 20/32
USPC .................................................. 455/405–407
See application file for complete search history.

(56) References Cited

U.S. PATENT DOCUMENTS

| | | | |
|---|---|---|---|
| 2005/0177517 A1* | 8/2005 | Leung | G06Q 20/20 705/64 |
| 2005/0181829 A1* | 8/2005 | Cho | H04M 1/274583 455/558 |
| 2010/0125737 A1* | 5/2010 | Kang | G06Q 20/12 713/176 |
| 2012/0310824 A1* | 12/2012 | Liberty | G06Q 40/02 705/40 |
| 2013/0137484 A1* | 5/2013 | Torres | H04B 1/3816 455/558 |
| 2014/0236812 A1* | 8/2014 | Capuozzo | G06Q 20/0855 705/39 |

* cited by examiner

*Primary Examiner* — Kamran Afshar
*Assistant Examiner* — Farid Seyedvosoghi
(74) *Attorney, Agent, or Firm* — Alberto Interian, III, Esq.

(57) ABSTRACT

The present disclosure relates generally to electronics systems, and more specifically to mobile communications systems and devices and including subscriber identification modules to which mobile currency, i.e. airtime minutes converted into mobile currency in pre-paid denominations from a telecommunications service provider, may be uploaded and used for payment transactions in a manner that is easier and more secure by providing a system and method related to a mobile phone having one or more subscriber identification module cards.

24 Claims, 7 Drawing Sheets

SYSTEM AND METHOD FOR SECURE PAYMENT PROCESSING USING SUBSCRIBER IDENTITY MODULE CARDS

PRIORITY CLAIM

This patent application is a Non-Provisional patent application and claims priority under 35 U.S.C. §119(e) to U.S. Provisional Patent Application Ser. No. 62/001,507, titled "System And Method For Providing Online Registrations For Subscriber Identity Module Cards" filed May 21, 2014. The entire disclosure of the afore-mentioned patent application is incorporated by reference as if fully stated herein.

FIELD OF THE INVENTION

The present disclosure relates generally to electronics systems, and more specifically to mobile communications systems and devices and including subscriber identification modules to which mobile currency, i.e. airtime minutes converted into mobile currency in pre-paid denominations from a telecommunications service provider, may be uploaded and used for payment transactions in a manner that is easier and more secure by providing a system and method related to a mobile phone having one or more subscriber identification module cards.

DESCRIPTION OF THE PRIOR ART

Mobile currency comes in different flavors. The sophisticated sort allows account-holders to transfer legal tender electronically to fellow account-holders by entering commands on a mobile phone. Popular though such services are, they have not stopped an older form of mobile currency from flourishing. This form uses pre-paid mobile-airtime minutes as a de facto currency that can be transferred between phones, exchanged for cash with dealers who rent mobile phones, or bartered for goods and services where the pre-paid mobile-airtime minutes may be swapped for cash or spent in shops.

In some instances establishing a mobile-money account typically requires waiting for days for approval after presenting identification. In contrast, mobile-airtime minutes can often be purchased and sent immediately and anonymously using a service which often allows nationwide transfers free of charge. This gives rise to the popularity of mobile-airtime minutes in certain countries as it is especially useful for settling small debts. For example in certain countries, shoppers are tired of receiving sweets in lieu of change, so shopkeepers who offer airtime minutes in lieu of yet another "$0.63-worth of chocolates" have a competitive advantage. The use of airtime minutes as currency is fuelled by the growing ease of sending airtime minutes abroad and its ease of use. However, the expanding use is largely unregulated as network operators are, in effect, issuing their own currency, trading in unregulated volumes and setting their own exchange rates, providing a loophole for criminals and extremist groups to use airtime minutes to covertly move money. Thus there is a need to have secure mobile currency when dealing with the use and issuance of airtime minutes to be used as currency. The within invention satisfies this long felt need in a new and novel manner an additional security layer to protect the subscriber's assets from fraud.

For a further and more fully detailed understanding of the present invention, various objects and advantages thereof, reference is made to the following detailed description and the accompanying drawings. Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

SUMMARY OF THE INVENTION

An aspect of an embodiment of the present invention contemplates a computer implemented system and method wherein a telecommunications service provider would sell bundles of cellular airtime minutes and data packages to merchants, and convert these cellular airtime minutes to mobile currency (MC) in various monetary units (e.g. $5; $10, $25, $50, and $100) that are offered for sale to participating merchants. Each participating merchant may purchase a series from the block of mobile currency, which is designated for a range of purchasable subscriber identity module cards ("SIM") cards for use in a SIM card system that includes one or more subscriber identification modules, where at least one SIM card is used for transacting in mobile currency.

When a subscriber purchases the mobile currency SIM card from a participating merchant, using a graphical user interface, subscriber may load mobile currency in the pre-paid denomination unto the SIM card in the denomination purchased using e.g. SMS text messaging service for the customer's mobile currency transactions, wherein the subscriber may authorize the transaction with the a server that interfaces through the gateway to the telecommunications billing and profile management servers. The merchant's account will credit the subscriber account balance once the SIM card purchase transaction is authorized and verified.

Once the SIM card is inserted into the mobile cellular device and loaded with the mobile currency, the subscriber may initiate a financial transaction that will debit the SIM card for the transaction's cost and transfer the mobile currency amount for the transaction's cost to the merchant's account or a third-party recipient. The graphical user interface ("GUI") may provide certain prompts, e.g. amount being transferred, the subscriber's account number, and authenticating inquiries, e.g. a security question. The merchant's account will be credited from the subscriber account balance once the transaction is authorized and verified.

This solution provides a secure means for the customer to conduct financial transactions without having to deal in paper currency and worry about theft. The wide-spread usage of 2G cellular phones and the ease of integration of using a proprietary SIM card that is loaded with mobile currency credits allows this solution to be easily deployed and provides an additional layer of security to safeguard the subscriber's account.

Upon receipt, merchant may use the GUI to confirm the transfer amount upon authentication of the merchant's account, e.g. answer a security question, providing for the crediting of the merchant's account. In some embodiments merchants access the GUI to conduct various other transactions, e.g. cash out their mobile currency, purchase mobile airtime minutes, pay cell phone bill and the like.

In some embodiment, the computer implemented system and method provides for customers to transfer mobile currency to a recipient in an easy seamless manner. In an exemplary embodiment, the sender purchases airtime minutes from a telecommunications provider and specifies the recipient of the funds, for which the payment transfer transaction may be assigned a unique code. This process is completed using the mobile device from a participating telecommunications provider, wherein the user will be able to authorize payment from their mobile device using the SIM card configured for conducting mobile currency transactions. Once the transaction is completed, customer may remove the SIM card and/or otherwise either use the same SIM card to access and use their regular telecommunications data service for telephone calls, SMS texts and the like or use another of the plurality of SIM cards to do the same. The recipient will receive notification of the incoming mobile currency transaction and can accept receipt of the mobile currency. In some embodiments, the recipient may be required to provide a unique code in order to receive the mobile currency, wherein the unique code may comprise of the unique code previously assigned to the specific money transfer transaction and/or a unique code assigned to the customer for receipts of money transfer transactions from any source, i.e. not just the sender.

In some embodiments, in order for the recipient to receive and accept the mobile currency, the recipient may be required to have the mobile currency SIM card. Recipients may use mobile currency with participating merchants until depleted whether to procure merchandise from vendors and/or telecom services from telecom service providers. In some embodiments, standard applicable SMS charges may occur for the services and/or transaction fees may apply to send mobile currency to recipients.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems

Figure 1:
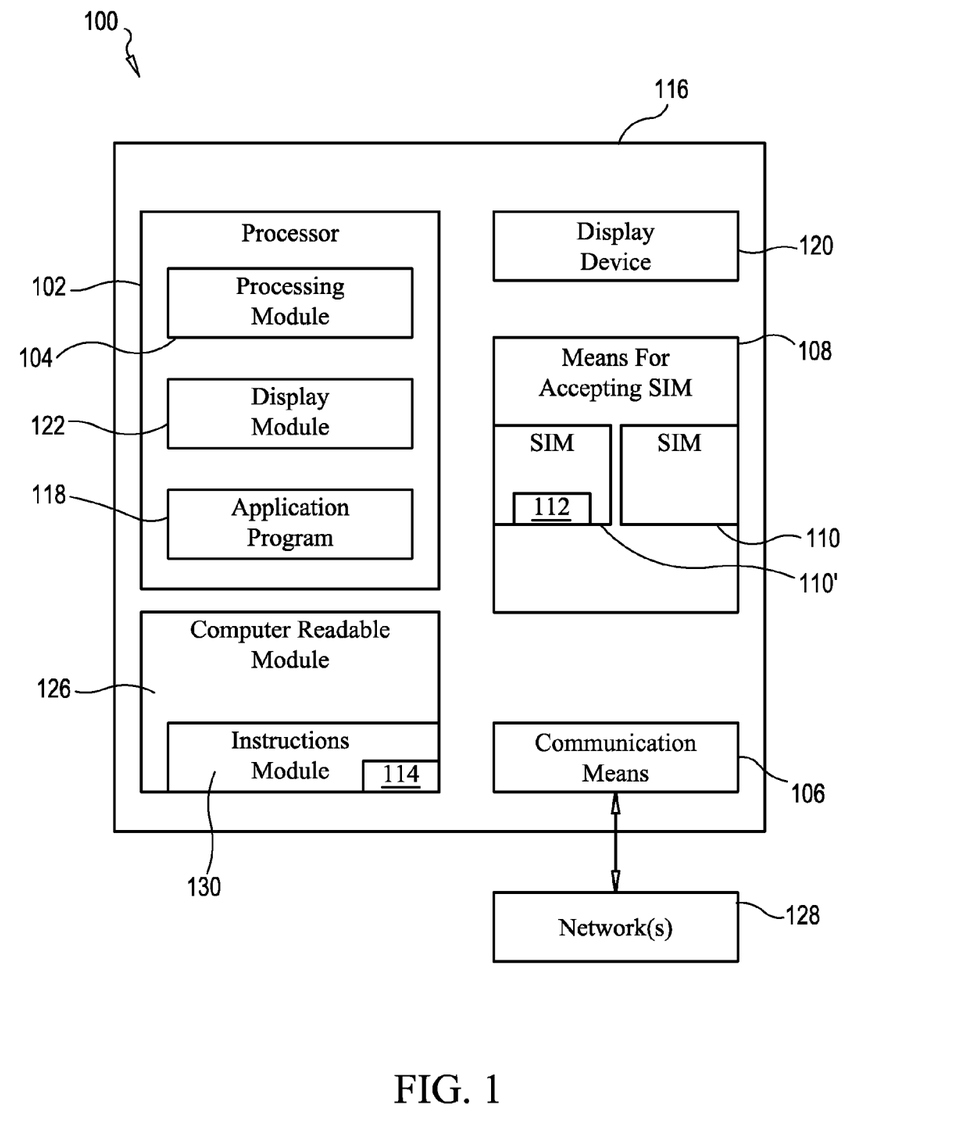
FIG. 1 shows an exemplary system according to an embodiment of the invention.

FIG. 1 shows an exemplary system 100 according to an embodiment of the invention. System 100 comprises at least one computer processor 102 that includes a processing module 104, at least one communications module 106 electronically connected to at least one processor 102, wherein said communications module 106 is operative to connect to a wireless communications network, at least one means 108 for accepting at least one subscriber identification module 110. In some embodiments, the at least one subscriber identification module 110 is one of a plurality of subscriber identification modules 110, 110' and is configured primarily for use with mobile currency while any remaining subscriber identification module(s) 110' is primarily used for traditional telecommunication services including voice and data services and the like (hereinafter referred to as "telecom services"). In some embodiments, the at least one subscriber identification module 110 is configured for processing both mobile currency transactions as well as traditional telecom services.

System 100 also comprises a registration module 112 in electronic communication with the at least one subscriber identification module 110, wherein the registration module 112 is configured for enabling registration of the at least one subscriber identification module 110 to the system 100 and for enabling at least one subscriber registration; and computer executable instructions 114 readable and executable by the at least one processor 102 that when executed by the at least one processor 102 cause the at least one processor 102 to perform the following: detect the presence of the at least one subscriber identification module 110 in the at least one means 108 for accepting at least one subscriber identification module 110, wherein the at least one subscriber identification module 110 is configured for managing mobile currency transaction requests; determine whether incoming or outgoing communications to or from a mobile communication device 116 implicate a financial transaction requiring mobile currency; selecting and enabling the at least one subscriber identification module 110 for performing financial transactions involving mobile currency; determining the presence of the at least one second subscriber identification module 110' in the at least one second means 108' for accepting at least one subscriber identification module 110 in a second mobile device 116; and enabling operation of an application program 118 comprising of computer executable instructions 114 readable and executable by the at least one processor 102 that when executed by the at least one processor 102 causes the at least one application program 118 to perform the following: provide a graphical user interface for accepting and receiving user commands for selective control of the management of the mobile currency on the at least one subscriber identification module 110.

The application program 118 is further configured for displaying on the mobile communication device's at least one display 120, the graphical user interface for receiving selective commands for controlling the management of the mobile currency; enabling the loading of prepaid mobile currency on the at least one subscriber identification module 110; crediting an account for the at least one registered subscriber with the amount of the prepaid mobile currency as loaded on the at least one subscriber identification module 110; and debiting and/or crediting the at least one subscriber's account based on authorized financial transactions involving mobile currency loaded on the subscriber identification module 110; determining and storing a balance for the at least one subscriber's account pursuant to any financial transactions (debits, credits transfers, and/or cashing out or the like); and preventing any financial transactions involving mobile currency to a second mobile communications device 116' if a second subscriber is not registered and/or at least one subscriber identification module 110' is not present in the at least one means 108 for accepting at least one or more subscriber identification modules 110, 110' in the second mobile communications device 116'.

The term "module," as used throughout this disclosure, may refer to a unit of distinct functionality that may be presented in software, hardware, and/or combinations thereof. When the functionality of a module is performed in any part through software, the module includes a machine readable medium. In one embodiment of the invention, these computer modules may be self-contained computer hardware resident on the computer processor 102 or resident on the mobile communication device 116. In another embodiment of the invention, they may be computer hardware on a designated computer chip or separate computer chips. In yet another embodiment of the invention, the processor 102 may include computer processing module 104, and an instructions module 118, wherein the processing module 104 may be configured to perform others tasks not undertaken by the other modules. In a further embodiment of the invention, the computer modules may be hardware resident on one chip, component, separate components or any combination thereof. In yet another embodiment of the invention, processing module 104, display module 122, instructions module 130, the communications module 120 and/or the various modules disclosed herein may all be in electronic communication with computer processing module 112.

Instructions module 130 may, in one embodiment of the invention, contain computer executable instructions 114 readable by computer processing module 104 configured for and used to implement the functions, operations, determinations, and the like, contemplated by the invention. In another embodiment of the invention, all of the computer modules may be interconnected with each other in different arrangements and/or combinations in order to implement the functions, operations, determinations, and the like, contemplated by the invention.

Computer central processor 102 may comprise any type of processor, such as, but not limited to, a mobile device's processor, a computer processor, a server processor, a central processing unit (CPU), a microprocessor, a video processor, a front end processor, a coprocessor, a single-core central processor, a multi-core processor, and the like. Processor 102 may be operative to communicate electronically with the shared computer processing server and/or the various modules disclosed herein and throughout the present disclosure, and the like. Said electronic communication may comprise any type of electronic communication, such as a network communication, a direct communication, an indirect communication, a wired communication, a wireless communication, and the like.

Processor 102 includes a processing module 104 that may comprise of a hardware aspect such as a computer processor 102, including, but not limited to, any of those previously described herein and throughout the present disclosure. In some embodiments, processing module 104 may comprise of a software aspect, such as, but not limited to, a computer program, such as an operating system, and the like. In yet another embodiment, processing module 104 may comprise both hardware and software aspects, such as those described directly above and elsewhere throughout the present disclosure. In some embodiments, processing module 104 may include software, e.g. computer software program, and hardware components to for example At least one communications module 106 may be any type of communications module, including, but not limited to, a wireless communications module or wired communications module, such as a GSM modem, a WiFi module, a Bluetooth module, a Zigbee module, and any other type of communications module used to communicate directly with another computer network enabled device, or indirectly with another device, such as through a local or wide area network. Accordingly, mobile communication device 116 may include communications module 106, such as, but not limited to, a wireless or wired communications module, which may include, but is not limited to, a cellular communications modem, a wireless area network communication modem, such as WLAN or WAN, an internet modem, a cable modem, a satellite modem, an antenna, and the like. In another embodiment of the invention, processor 102 (or processing module 104 in another aspect) may be in communication with communications module 106 in order to implement the functions, operations, determinations, and the like, contemplated by the invention.

In another embodiment, at least one means 108 for accepting at least one or more subscriber identification modules may comprise a traditional subscriber identification module (SIM) card tray, or multiple SIM card tray, such as a dual-SIM card tray. In some embodiments, the one or more subscriber identification modules 110, 110' may comprise traditional SIM cards, micro SIM cards, nano SIM cards, or any other type of subscriber identification module 110 known in the art.

In some embodiments, the registration module 112 may comprise of hardware, e.g. biometric verification means for authenticating the identity of the subscriber. Biometric verification means may be disposed in communication with a computer processor 102 and a biometric scanner, for example, a fingerprint scanner, hand geometry scanner, a palm geometry scanner, iris scanner, retina scanner, or a user interface, which includes an audio receiving circuit capable of receiving audio signals at predetermined frequencies and/or with additional hardware complete with electronic circuitry and such other biometric verification means that are known and used in the arts, wherein the computer processor 102 controls the functionality of the biometric scanner, generating the varied algorithms for storage of the initial valid biometric samples stored as biometric identifiers for subsequent validation of biometric samples.

In some embodiments, the registration module 112 may comprise of software aspects as previously disclosed herein and in some embodiments registration module 112 comprise of both hardware and software aspects. In some embodiments, the registration module may be stored in the subscriber identification module 110 and/or on a computer readable storage medium.

In another aspect of an embodiment of the present invention, system 100 may also include a processing module 104 for controlling and/coordinating all operations of system 100. Processing module 104 may also be responsible for making all determinations for system 100. Processing module 104 may also perform the operation(s) of system 100 which are not performed or covered by the other modules of system 100. Processing module 104 may also have access to computer program product having computer executable instructions 114 necessary for the execution/implementation of all operations disclosed in aspect(s) of embodiment(s) of the present invention. In one aspect, the computer program product may be resident on processing module 104, each respective modules of system 100 or in a combination of locations. The computer program product may also be loaded onto any or all of system 100's modules.

Computer executable instructions 114 may be loaded directly on the processor's processing module 104, or may be stored in mobile device's non-transitory computer readable medium 126, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 114 may be any type of computer executable instructions 114, which may be in the form of a computer program, the program being composed in any suitable programming language or source code, such as C++, C, JAVA, JavaScript, HTML, XML, and other programming languages. The computer executable instructions 114 may be or may include any type of computer executable instructions, such as but not limited to, computer coded instructions, a computer application, a computer program, a downloadable computer application, and the like. In some embodiments, computer executable instructions 114 may be stored on a non-transitory computer readable medium 126 readable and executable by the processor 104, wherein the non-transitory computer readable medium 126 may comprise of computer memory, computer storage, and the like.

The non-transitory computer readable medium 126 may be part of the same device of which processor 104 is a part. Computer readable medium 126 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Computer readable medium 126 may be used to store information, such as subscriber's registration information, account balances for the mobile currency, history of mobile currency transactions, and the like. Information stored on the computer readable medium 126 may be retrieved using the computer processor 104 and may be published by push notification on for example the mobile device's display device 120 or published over the mobile device's speaker using the type and configuration of speakers that are well known and used in the arts for mobile communication devices.

In some embodiments as shown in the exemplary system in FIG. 1, the at least one processor 102, at least one communications module 106, and the at least one subscriber identification module 110 and various other modules and hardware disclosed herein are part of, or integrated into a mobile communications device 106. Mobile communication device 116 may be any type of electronic computing device configured with means for communicating wirelessly and/or wired with other networked enabled devices, such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network 128.

System 100 may include any kind of displaying means 124, such as, but not limited to: a liquid crystal display ("LCD") screen, a plasma display, a light emitting diode ("LED") display, touchpad or touch screen display, and/or any other means known in the arts for emitting a visually perceptible output. The at least one processor 102 is in electronic communication with the displaying module 122 that controls the display 120 on the displaying means 116. In other embodiments, displaying means 124 is wirelessly connected to processor 104. Displaying means 124 may include a control means, such as, but not limited to, a touch screen, a stylus, and the like. In some embodiments, displaying means 124 may be electronically connected to a client device 102' according to the hardware and software protocols that are known and used in the arts. Processor 104 controls the mobile device's displaying means 116, which is configured for displaying for example, the security question, amounts to be transferred, balance remaining and the like.

In yet another embodiment, system 100 may comprise at least one mobile communication device 116, which houses at least one processor 102, at least one display device 104, and at least one communications module 106. The mobile communication device 116 may be a mobile phone, a tablet PC, a mobile PC, a smart phone, or a standalone mobile device, and the like.

Figure 2:
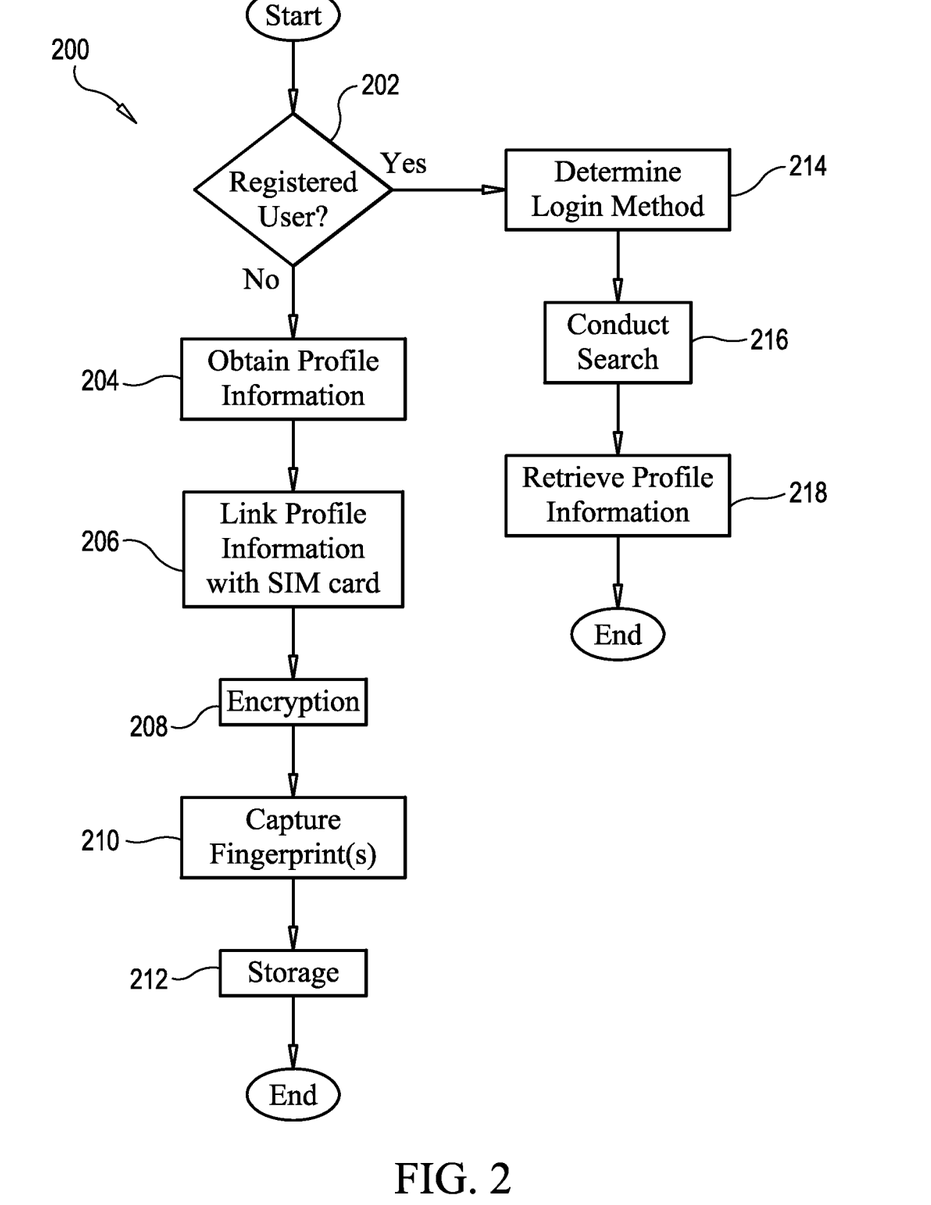
FIG. 2 shows an exemplary process flow chart according to aspect(s) of embodiment(s) of the present invention.

Referring now to FIGS. 1 and 2, an exemplary process flow chart 200, and an exemplary setup of components of system 100, according to aspect(s) of embodiment(s) of the present invention are shown. A user/subscriber/potential subscriber of the system 100 starts process 200 at step 202 by logging in or attempting to log in to system 100. System 100 then determines whether he/she is a current registered user in step 202 by authenticating the subscriber using a graphical user interface to, for example, pose security questions, receive user input provided by the display's control means, authenticate and confirm the subscriber is authorized as an approved subscriber to conduct financial mobile currency transactions using this subscriber identification module 110. As such, system 100 determines the login method (step 214), conducts a search (step 216) of the subscriber's registration information, and retrieves the subscriber's profile information (step 218).

However, if the subscriber is not a registered user, the registration module 112 may be in communication with processing module 104 wherein processing module 104 may, using computer execution instructions 114 resident on instructions module 130 instruct the display module 122 to display for instance a graphical user interface that the user may use to provide registration (profile) information, and the display module then displays the registration process on the mobile communication device's display 120 where the subscriber's profile information is obtained (step 204). Processing module 104 then links the subscriber's profile information with the subscriber identification module 110 (step 206) for future subscriber authentication prior to consummating a financial transaction requiring mobile currency. In some embodiments, system 100 may encrypt the subscriber's information (step 208); or capture biometric identification information, e.g. a fingerprint (step 210), wherein the subscriber's profile including any captured biometric identifiers are stored for future reference. (step 212).

The registration process is facilitated in one aspect of an embodiment of the present invention, by the registration module 112, which provides the interface for the user/subscriber/potential subscriber to log on to the system 200. In one aspect, registration module 112 may be in communication with processing module 104 wherein processing module 104 may, using computer execution instructions 114 resident on instructions module 130 instruct the display module 122 to display, which then displays the registration process on the mobile communication device's display 120. In one aspect of an embodiment of the present invention, registration may be done on a mobile device having access to system 200. In one aspect of the present invention, a user may access a mobile phone application program 118 to apply for a SIM card 110 that is configured for financial transactions involving mobile currency, for which the various required registration information may be manually inputted. Additionally, the user may select a finger for which his/her biometric identifier will be stored as art of the registration process, i.e. user may provide a valid biometric sample, which gets stored as a biometric identifier for later verification of the SIM card owner.

In another aspect of an embodiment of the present invention, registration may be completed on and/or at a kiosk or computer terminal etc. In all cases, the devices are in communication with system 100 in a variety of ways including wired connections, wireless connections, the internet, and the like. It should be noted that in an aspect of an embodiment of the present invention, the modules of system 100 may be in communication with one or more of each of the system modules of system 100. In another aspect of an embodiment of the present invention, system 100 may also include a processing module 104 for controlling and/coordinating all operations of system 100. Processing module 104 may also be responsible for making all determinations for system 100. Processing module 104 may also perform the operation(s) of system 100 which are not performed or covered by the other modules of system 100. Processing module 104 may also have access to computer program product having computer readable program code necessary for the execution/implementation of all operations disclosed in aspect(s) of embodiment(s) of the present invention. In one aspect, the computer program product may be resident on processing module 104 may, each respective modules of system 200 or in a combination of locations. The computer program product may also be loaded onto any or all of system 200's modules.

Figure 3:
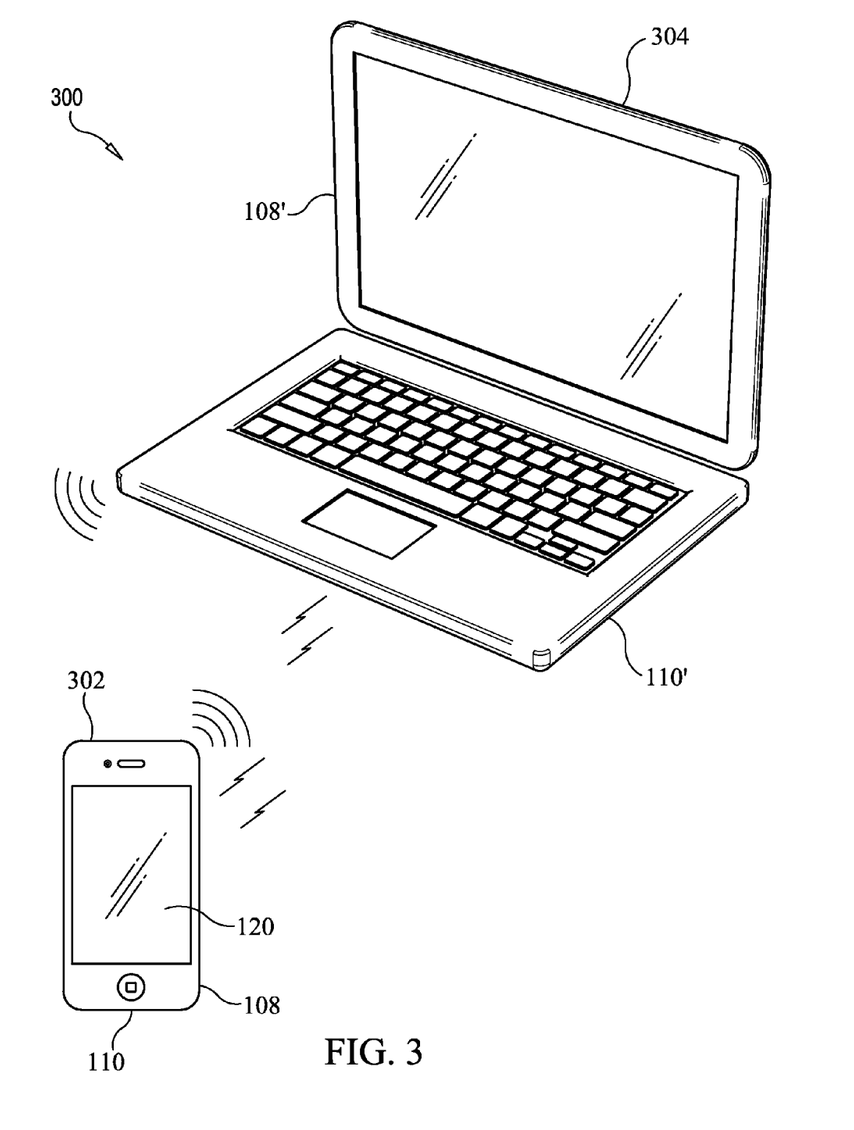
FIG. 3 shows an exemplary system of the invention according to one embodiment.

FIG. 3 shows a system 300 in accordance with one embodiment, wherein system 300 comprises at least one first mobile communications device 302 operative to transact and connect with an exemplary merchant's second mobile communication device 304 via a local wireless communications network 306.

In the exemplary embodiment, at least one first mobile communications device 302 comprises any type of mobile communications device 116, such as a mobile phone, a smartphone, a tablet PC, a laptop PC and the like, including but not limited to an international mobile phone. In another embodiment, at least one second mobile communications device 304 comprises any type of mobile communications device, such as a mobile phone, a smartphone, a tablet PC, a laptop PC and the like, including but not limited to a domestic mobile phone.

In some embodiments a consumer purchases the subscriber identification module 110 and mobile currency in varied denomination from a telecom provider. The mobile currency is inactive and unable to be used unless they have been loaded on the subscriber identification module 110 in accordance with the systems and processes of FIGS. 1 & 2, respectively. Should the consumer wish to use the mobile currency to pay for a transaction with a merchant (either remotely over the internet or in a brick and mortar store), both parties will need to be registered with the system and methods disclosed herein. As such, the system's processor module 104 in communication with the processor 102 is configured to detect the presence of the at least one subscriber identification module 110 in the at least one means for 108 accepting at least one subscriber identification module 110, wherein the at least one subscriber identification module 110 is configured for managing mobile currency transaction requests prior to the transaction being approved to occur.

The processor 102 is further configured for using its processing module 104 to control the operations discussed herein including but not limited to any one or more of the following: authenticating the subscriber as an authorized user of the subscriber identification module 110 prior to the purchase transaction being consummated, wherein the authentication process follows steps 202-218 of FIG. 2 to verify and/or register the subscriber's identification information; enabling the loading of prepaid mobile currency on the at least one subscriber identification module 110; selecting and enabling the at least one subscriber identification module 110 for performing financial transactions involving mobile currency; receiving a payment request (e.g. payment transfer of mobile currency) for a requested amount of mobile currency; determining availability of mobile currency, i.e. if the requested amount is less than or equal to the mobile currency loaded on the subscriber identification module 110, otherwise the payment transaction will be denied; determining the presence of the at least one second subscriber identification module 110' in the at least one second means 108' for accepting at least one subscriber identification module 110 in a second mobile communication device 116' which may be accomplished by for example, verifying that the intended recipient's address is registered with the system 300 as a subscriber (if not, the recipient is not a subscriber) and/or the at least one second subscriber identification module 110' in the at least one second means 108' for accepting at least one subscriber identification module 110 in a second mobile communication device 116' is not detected, processor 102 prevents any financial transactions involving mobile currency to the receiving second mobile communications device 116.

In some embodiments, the recipient is a subscriber and/or the at least one subscriber identification module 110' is present in the at least one second means 108' for accepting at least one or more subscriber identification modules 110' in the second mobile communications device 116' accordingly, processor 102 authorizes the transfer of the requested amount for the payment transaction by, for example, SMS text to the merchant recipient and via the computer executable instructions 114 in the instruction module 130 activates the communications module 106 to transmit payment of the requested amount to the merchant's mobile communication device 116' (personal computer or point of sale system) for which a unique code is assigned for the payment transaction; debits the sending subscriber's account for the payment and credits the receiving merchant subscriber's account with the mobile currency.

In some embodiments, the recipient may be required to provide a unique code in order to receive the mobile currency, wherein the unique code may comprise of the unique code previously assigned to the payment transaction and/or a unique code assigned to the subscriber for receipts of money transfer transactions from any source, i.e. not just the sender.

In some embodiments, the consumer and/or the merchant may be required to pay a fee for using the systems and methods, and/or the transmittal of the mobile currency. In other embodiments, the transmittal is bundled as part of the telecommunications services wherein the mobile communications device 302 may be assessed a fee for accessing local wireless communications network. In some embodiments, the fee may be assessed by a telecommunications provider, such as a cellular phone service provider, and the like. Accordingly, the local wireless communications 306 network may be provided by such a telecommunications provider.

In yet another embodiment, at least one communications module 106 comprises a communications module for accessing a web-enabled device, such as a Bluetooth module for accessing a web-enabled smartphone.

In another embodiment, at least one means 108 for accepting at least one or more subscriber identification modules may comprise a traditional subscriber identification module (SIM) card tray, or multiple SIM card tray, such as a dual-SIM card tray. In some embodiments, local and global SIM cards 110, 112 may comprise traditional SIM cards, micro SIM cards, nano SIM cards, or any other type of subscriber identification module known in the art.

In some embodiments, at least one processor 102 is connected to or integrated into a mobile communications device 116, such as a mobile phone. In some embodiments, the computer executable instructions 114 may be stored locally, in whole or in part, such as in the mobile communications device 116. In other embodiments, the computer executable instructions 114 may be stored remotely, in whole or in part, such as in a central station. The central station may be a cellular telephone/data service provider. The computer executable instructions may take the form of a downloadable application, such as, but not limited to a mobile application.

In some embodiments, a consumer may be provided with at least one subscriber identification module 110, as well as access to a downloadable application. In another embodiment, the user may be provided access, or rights to purchase, the downloadable application, and upon purchasing, downloading, or accessing the application, may be provided a at least one subscriber identification module 110.

Furthermore, by requiring that at least one subscriber identification module 110 be present in order to use system 100 to communicate, a user is authenticated and security is heightened.

Methods

Figure 4:
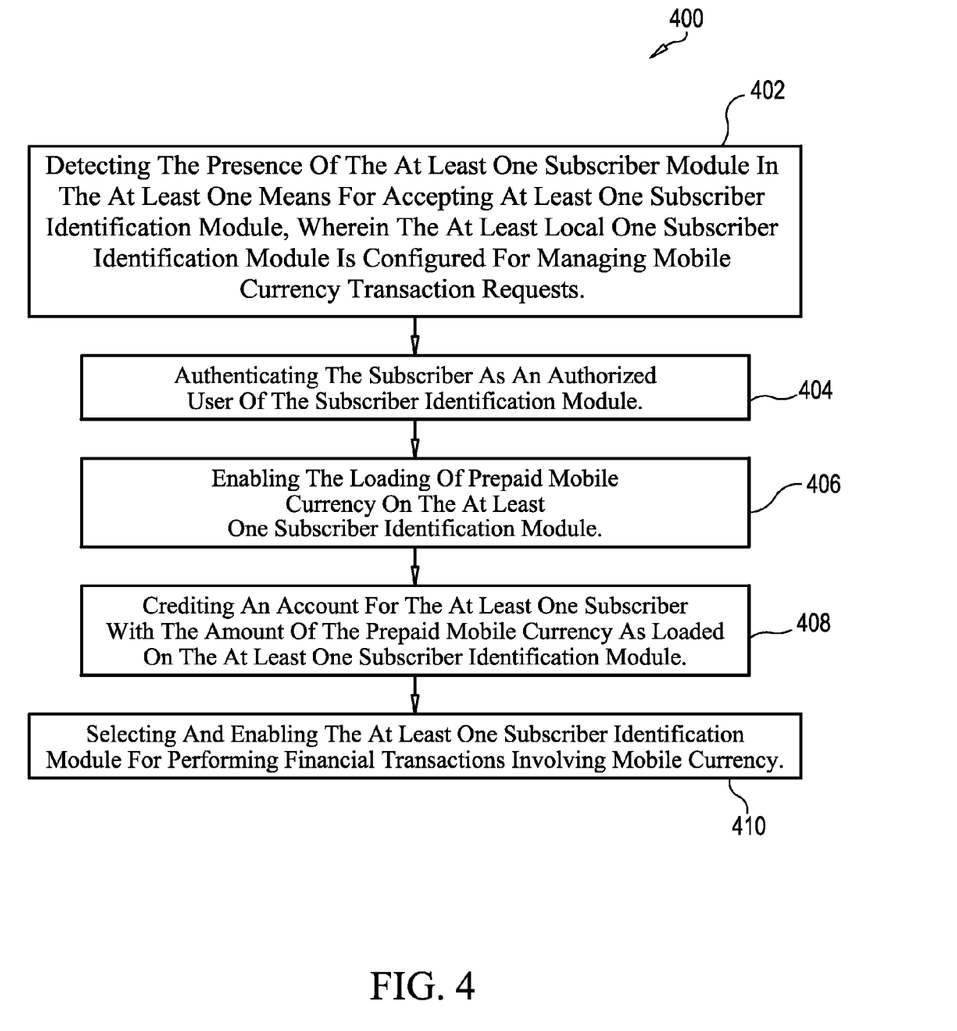
FIG. 4 shows a block diagram depicting a method in accordance with one embodiment of the invention.

FIG. 4 shows a block diagram depicting a method 400 in accordance with one embodiment of the invention, wherein method 400 may comprise using at least one processor 102 to perform any or all of the following steps: detecting the presence of the at least one subscriber identification module 110 in the at least one means 108 for accepting at least one subscriber identification module 110, wherein the at least one subscriber identification module 110 is configured for managing mobile currency transaction requests (step 402); authenticating the subscriber as an authorized user of the subscriber identification module 110 (step 404), wherein the authentication process follows steps 202-218 of FIG. 2 to verify and/or register the subscriber's identification information; enabling the loading of prepaid mobile currency on the at least one subscriber identification module 110 (step 406); and crediting an account for the at least one subscriber with the amount of the prepaid mobile currency as loaded on the at least one subscriber identification module 110 (step 408) after which the loaded mobile currency is available for use in financial transactions that accept mobile currency. As such, method 400 further comprises selecting and enabling the at least one subscriber identification module 110 for performing financial transactions involving mobile currency (step 410).

In some embodiments the at least one subscriber identification module 110 is especially coded for conducting financial transactions using mobile currency and processor selects the at least one subscriber identification module 110 as one of a plurality of subscriber identification modules 110, 110' for example one of two in a dual SIM card mobile communication device 116, wherein the system 100 uses different subscriber identification module 110 for telecom services.

In some embodiments, the at least one subscriber identification module 110 is specially coded to conduct both financial transactions using mobile currency as well as telecom services.

Figure 5:
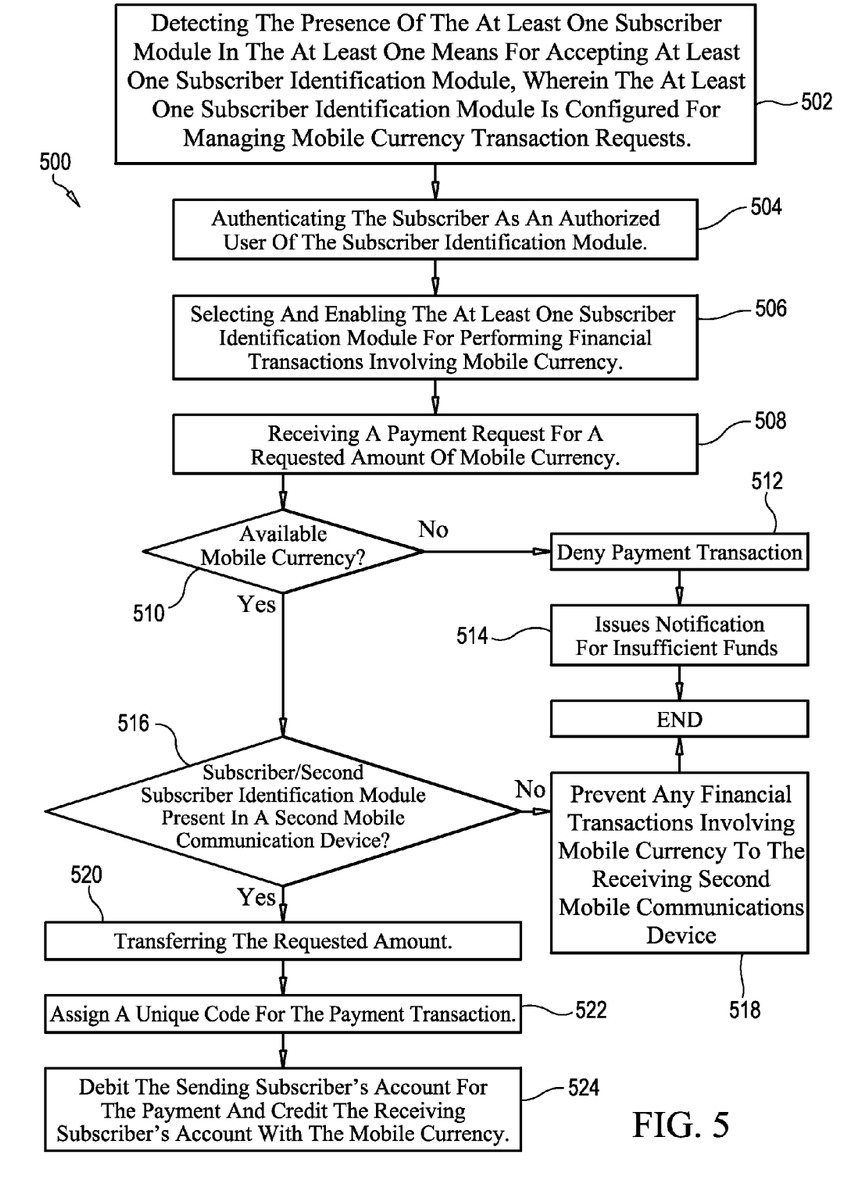
FIG. 5 shows a block diagram depicting a method 400 in accordance with one embodiment of the invention.

FIG. 5 shows a block diagram depicting a method 500 of using the subscriber identification module 110 in a payment transaction involving mobile currency in accordance with one embodiment of the invention. In order to use the mobile currency on the subscriber identification module 110, this requires subscriber to at least register with the system and method in accordance with the steps described in FIG. 2 in order to tender the mobile currency in a payment transaction.

Method 500 comprises using at least one processor 102 to perform any or all of the following steps detecting the presence of the at least one subscriber identification module 110 in the at least one means 108 for accepting at least one subscriber identification module 110, wherein the at least one subscriber identification module 110 is configured for managing mobile currency transaction requests (step 502); authenticating the subscriber as an authorized user of the subscriber identification module 110 (step 504), wherein the authentication process follows steps 202-218 of FIG. 2 to verify and/or register the subscriber's identification information; enabling the loading of prepaid mobile currency on the at least one subscriber identification module 110. Once the mobile currency is loaded in accordance with steps 406 & 408 of FIG. 4, method 500 comprises using at least one processor 102 for selecting and enabling the at least one subscriber identification module 110 for performing financial transactions involving mobile currency (step 506); receiving a payment request (e.g. payment or mobile currency transfer) for a requested amount of mobile currency (step 508); determining availability of mobile currency (step 510), i.e. if the requested amount is less than or equal to the mobile currency loaded on the subscriber identification module 110. If it is not, then method 500 denies the payment transaction (step 512) and issues notification for display of insufficient funds to subscriber that will be displayed on the mobile device's display 120 (step 514).

However, if the requested amount is less than or equal to the mobile currency loaded on the subscriber identification module 110, method 500 comprises determining the presence of the at least one second subscriber identification module 110' in the at least one second means 108' for accepting at least one subscriber identification module 110 in a second mobile communication device 116' (step 516). The determining step may be accomplished by verifying that the intended recipient's address is registered with the system as a subscriber.

If the recipient is not a subscriber and/or the at least one second subscriber identification module 110' in the at least one second means 108' for accepting at least one subscriber identification module 110 in a second mobile communication device 116' is not detected, method 500 comprises preventing any financial transactions involving mobile currency to the receiving second mobile communications device 116 (step 518).

If however, the recipient is a subscriber and/or the at least one subscriber identification module 110' is present in the at least one second means 108' for accepting at least one or more subscriber identification modules 110' in the second mobile communications device 116' then method 500 comprises transferring the requested amount (step 520) by for example SMS text to the recipient for which method 500 assigns a unique code for the payment transaction; debits the sending subscriber's account for the payment (step 522) and crediting the receiving subscriber's account with the mobile currency (step 524).

In some embodiments, the recipient may be required to provide a unique code in order to mobile currency, wherein the unique code may comprise of the unique code previously assigned to the payment transaction and/or a unique code assigned to the subscriber for receipts of money transfer transactions from any source, i.e. not just the sender.

In some embodiments, method 500 further comprises notifying recipient of the received mobile currency for which will be published on the second mobile communication device's displaying means 120'.

In some embodiments, the at least one processor may be part of or integrated into a mobile communications device, such as, but not limited to, a smartphone, a mobile phone, a tablet PC, a laptop, and the like.

In some embodiments, using at least one processor comprises using computer executable instructions readable by the at least one processor. In some embodiments, the computer executable instructions may be stored, in whole or in part, remotely, such as on a server or central station, or locally, such as on a local non-transitory (or transitory) computer readable medium, wherein the local storage means may be connected to, part of, or integrated with the at least one processor and/or the mobile device. In some embodiments, the central station may be a cellular telephone/data service provider. The computer executable instructions may take the form of a downloadable application, such as, but not limited to a mobile application.

In some embodiments, a user may be provided with at least one subscriber identification module, as well as access to a downloadable application. In another embodiment, the user may be provided access, or rights to purchase, the downloadable application, and upon purchasing, downloading, or accessing the application, may be provided a at least one subscriber identification module.

In some embodiments, method 400 may implement or be a part of the various embodiments of systems and methods described herein, such as those described above with reference to FIGS. 1 through 3.

Figure 6:
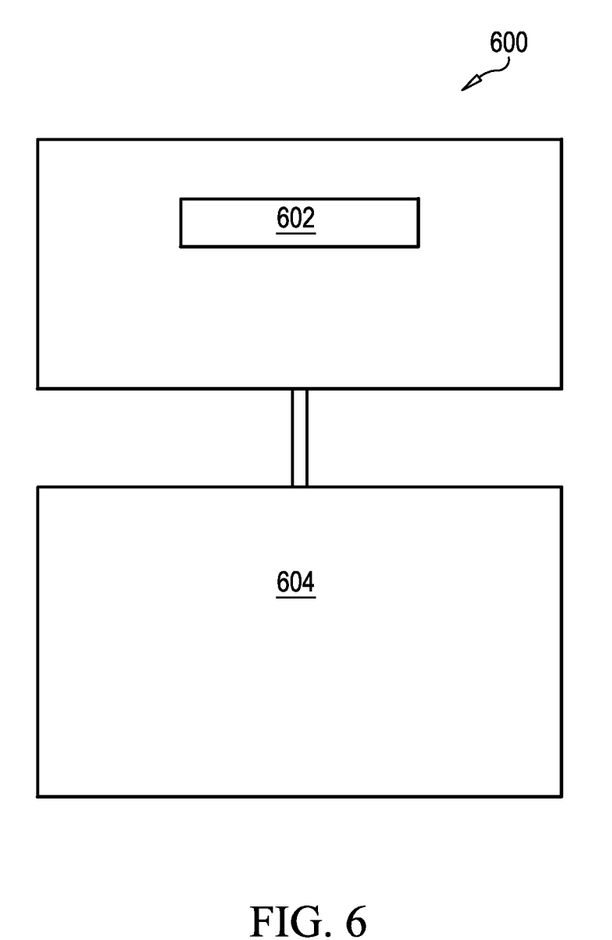
FIG. 6, a block diagram depicting a non-transitory computer readable medium is shown in accordance with one embodiment

Referring now to FIG. 6, a block diagram depicting a non-transitory computer readable medium 600 is shown in accordance with one embodiment, wherein computer readable medium 600 may comprise computer executable instructions 602 readable by at least one processor 604 and operative to perform any or all of the following steps or functions, for example: determine whether incoming or outgoing communications to or from a mobile communication device 116 implicate a financial transaction requiring mobile currency; selecting and enabling the at least one subscriber identification module 110 for performing financial transactions involving mobile currency; and enabling operation of an application program 118 comprising of computer executable instructions 114 readable and executable by the at least one processor 102 such that when executed by the at least one processor 102 causes the at least one application program 118 to perform provide a graphical user interface for accepting and receiving user commands for selective control of the management of the mobile currency on the at least one subscriber identification module 110 and the various functions otherwise listed herein.

In some embodiments, the at least one processor 604 may be part of or integrated into a mobile communications device 116. In some embodiments, the mobile communications device 116 may comprise a mobile phone, a tablet PC, a smartphone, a laptop, and the like.

In one embodiment, the computer executable instructions 602 may be stored, in whole or in part, remotely, such as in a server or central station, or locally, such as in the mobile communications device 116. In some embodiments, the central station may comprise any type of central station, such as those described above with reference to FIGS. 1 through 4.

Non-transitory computer readable medium 600 may comprise any type non-transitory computer readable medium, such as, but not limited to, a hard drive, a flash drive, a solid state drive, computer memory, a compact disc, a DVD, and the like. Computer readable medium 600 may comprise any of the various embodiments described herein, such as those described with reference to FIGS. 1 through 5.

In some embodiments, computer executable instructions 602 may comprise the various embodiments of computer executable instructions described herein, such as those described above with reference to FIGS. 1-5. Computer executable instructions 602 may be part of, used in, or be included in the various systems and methods described herein.

In aspect(s) of embodiment(s) of the present invention, a software program may be launched from a computer readable medium in computer-based systems to execute the functions defined in the present invention. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Hardware and Operating Environment

This section provides an overview of example hardware and the operating environments in conjunction with which embodiments of the inventive subject matter can be implemented.

A software program may be launched from a computer readable medium in a computer-based system to execute the functions defined in the software program. Various programming languages may be employed to create software programs designed to implement the system 100 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
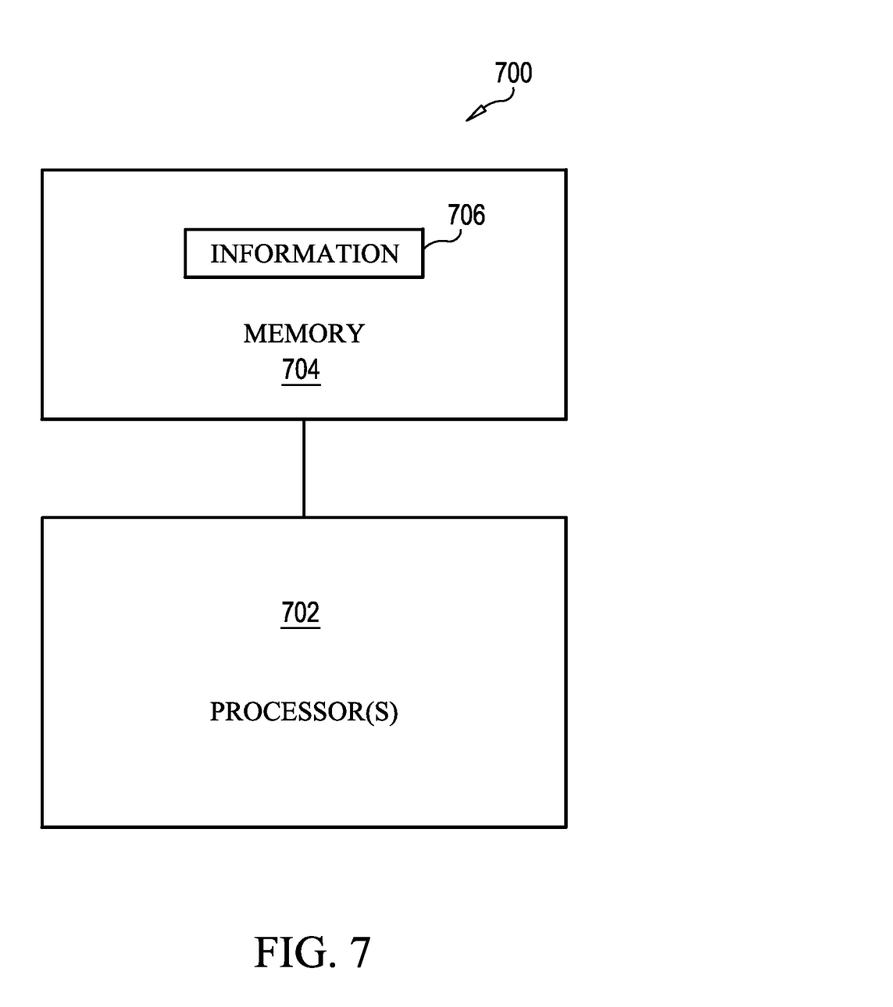
FIG. 7 is a block diagram representing an apparatus according to various embodiments.

FIG. 7 is a block diagram representing an apparatus 700 according to various embodiments. Such embodiments may comprise a computer, a memory system, a magnetic or optical disk, some other storage device, or any type of electronic device or system. The apparatus 700 may include one or more processor(s) 704 coupled to a machine-accessible medium such as a memory 706 (e.g., a memory including electrical, optical, or electromagnetic elements). The medium may contain associated information 706 (e.g., computer program instructions, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   at least one processor;
   at least one communications module electronically connected to the at least one processor, wherein the at least one communications module is operative to connect to a wireless communications network;
   at least one subscriber identification module card tray;
   a registration module for enabling registration of at least one subscriber identification module to the system and to enable at least one subscriber registration; and
   computer executable instructions readable and executable by the at least one processor that when executed by the at least one processor cause the at least one processor to perform the following:
   determine whether incoming or outgoing communications to or from a mobile communication device implicate a financial transaction requiring mobile currency;
   selecting and enabling the at least one subscriber identification module for performing financial transactions involving mobile currency; and
   enabling operation of an application program comprising of computer executable instructions readable and executable by the at least one processor that when executed by the at least one processor causes the application program to perform the following:
   provide a graphical user interface for accepting and receiving user commands for selective control of management of the mobile currency on the at least one subscriber identification module; and
   preventing any financial transactions involving mobile currency to a second mobile communications device if a second subscriber is not registered and/or at least one second subscriber identification module enabled for performing financial transactions involving mobile currency is not present in at least one second subscriber identification module card tray in a second mobile communications device.

2. The system of claim 1 further comprising the at least one processor being configured to detect presence of the at least one subscriber identification module in the at least one subscriber identification module card tray, wherein the at least one subscriber identification module is configured for managing mobile currency transaction requests.

3. The system of claim 1 wherein the application program, by the at least one processor's execution of the computer executable instructions of the application program is further configured for displaying on the mobile communication device's at least one display, the graphical user interface for receiving selective commands for controlling the management of the mobile currency.

4. The system of claim 1, wherein the application program, by the at least one processor's execution of the computer executable instructions of the application program is further configured to perform any one or more of the following:
   enabling loading of prepaid mobile currency on the at least one subscriber identification module;
   crediting an account for the at least one subscriber with an amount of the prepaid mobile currency as loaded on the at least one subscriber identification module;
   debiting or crediting the at least one subscriber's account based on authorized financial transactions involving mobile currency loaded on the subscriber identification module; or
   determining and storing a balance for the at least one subscriber's account.

5. The system of claim 1, further comprising enabling the at least one subscriber identification module for telecommunication services.

6. The system of claim 1, wherein the at least one processor, at least one communications module, and the at least one subscriber identification module are part of or integrated into a mobile communications device.

7. The system of claim 1, further comprising determining presence of the at least one second subscriber identification module in the at least one second subscriber identification module card tray in the second mobile communication device.

8. The system of claim 1, wherein mobile currency transaction requests comprises any one or more of the following: loading mobile currency on the at least one subscriber identification module; transferring mobile currency to a recipient or making a payment for merchandise.

9. A non-transitory computer readable medium comprising:
computer executable instructions readable and executable by at least one processor that when executed by the at least one processor cause the at least one processor to perform the following:
determine whether incoming or outgoing communications to or from a mobile communication device implicate a financial transaction requiring mobile currency;
selecting and enabling at least one subscriber identification module for performing financial transactions involving mobile currency; and
enabling operation of an application program comprising of computer executable instructions readable and executable by the at least one processor that when executed by the at least one processor causes the at least one application program to perform the following:
provide a graphical user interface for accepting and receiving user commands for selective control of management of the mobile currency on the at least one subscriber identification module; and
preventing any financial transactions involving mobile currency to a second mobile communications device if a second subscriber is not registered and/or at least one second subscriber identification module enabled for performing financial transactions involving mobile currency is not present in at least one second subscriber identification module card tray in a second mobile communications device.

10. The non-transitory computer readable medium of claim 9, further comprising detecting presence of the at least one subscriber identification module in at least one subscriber identification module card tray, wherein the at least one subscriber identification module is configured for managing mobile currency transaction requests.

11. The non-transitory computer readable medium of claim 9, further comprising displaying on the mobile communication device's at least one display, the graphical user interface for receiving selective commands for controlling the management of the mobile currency.

12. The non-transitory computer readable medium of claim 9, wherein the application program, by the at least one processor's execution of the computer executable instructions of the application program is further configured to perform any one or more of the following:
enabling loading of prepaid mobile currency on the at least one subscriber identification module;
crediting an account for the at least one subscriber with an amount of the prepaid mobile currency as loaded on the at least one subscriber identification module;
debiting or crediting the at least one subscriber's account based on authorized financial transactions involving mobile currency loaded on the subscriber identification module; or
determining and storing a balance for the at least one subscriber's account.

13. The non-transitory computer readable medium of claim 9, further comprising enabling the at least one subscriber identification module for telecommunication services.

14. The non-transitory computer readable medium of claim 9, wherein the at least one processor, at least one communications module, and the at least one subscriber identification module are part of or integrated into a mobile communications device.

15. The non-transitory computer readable medium of claim 9, further comprising determining presence of the at least one second subscriber identification module in the at least one second subscriber identification module card tray in the second mobile communication device.

16. The non-transitory computer readable medium of claim 9, wherein mobile currency transaction requests comprises any one or more of the following: loading mobile currency on the at least one subscriber identification module; transferring mobile currency to a recipient or making a payment for merchandise.

17. A computer implemented method comprising:
determine by at least one processor whether incoming or outgoing communications to or from a mobile communication device implicate a financial transaction requiring mobile currency;
selecting and enabling at least one subscriber identification module for performing financial transactions involving mobile currency; and
enabling operation of an application program comprising of computer executable instructions readable and executable by the at least one processor that when executed by the at least one processor causes the at least one application program to perform the following:
provide a graphical user interface for accepting and receiving user commands for selective control of management of the mobile currency on the at least one subscriber identification module; and
preventing any financial transactions involving mobile currency to a second mobile communications device if a second subscriber is not registered and/or at least one second subscriber identification module enabled for performing financial transactions involving mobile currency is not present in at least one second subscriber identification module card tray in a second mobile communications device.

18. The method of claim 17, further comprising detecting by the at least one processor presence of the at least one subscriber identification module in at least one subscriber identification module card tray, wherein the at least one subscriber identification module is configured for managing mobile currency transaction requests.

19. The method of claim 17, further comprising displaying on the mobile communication device's at least one display, the graphical user interface for receiving selective commands for controlling the management of the mobile currency.

20. The method of claim 17, further comprising:
enabling loading of prepaid mobile currency on the at least one subscriber identification module;
crediting an account for the at least one subscriber with an amount of the prepaid mobile currency as loaded on the at least one subscriber identification module;
debiting or crediting the at least one subscriber's account based on authorized financial transactions involving mobile currency loaded on the subscriber identification module; or determining and storing a balance for the at least one subscriber's account.

21. The method of claim 17, further comprising enabling the at least one subscriber identification module for telecommunication services.

22. The method of claim 17, wherein the at least one processor, at least one communications module, and the at least one subscriber identification module are part of or integrated into a mobile communications device.

23. The method of claim 17, further comprising determining presence of the at least one second subscriber identification module in the at least one second subscriber identification module card tray in a second mobile communication device.

24. The method of claim 17, wherein mobile currency transaction requests comprises any one or more of the following: loading mobile currency on the at least one subscriber identification module; transferring mobile currency to a recipient or making a payment for merchandise.

* * * * *